April 27, 1926.
J. HUGHES
DIVIDER BOARD
Filed Sept. 26, 1925
1,582,753
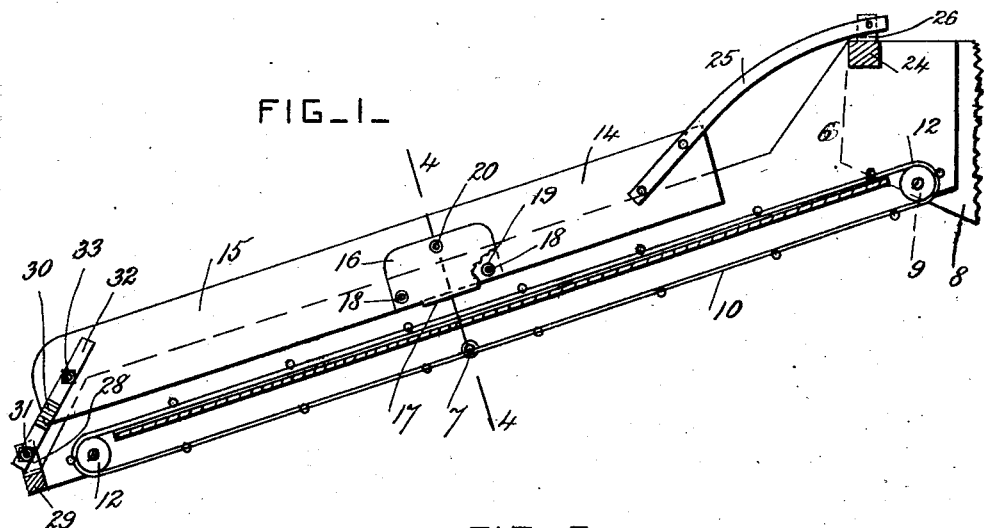
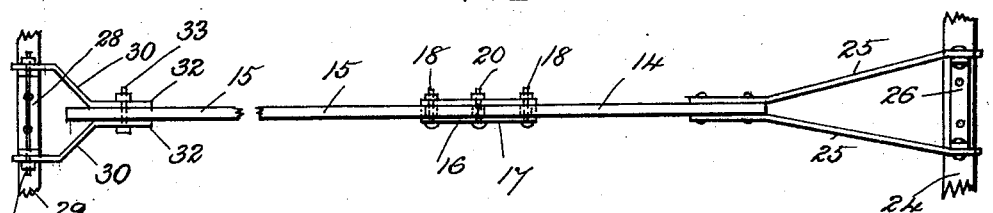
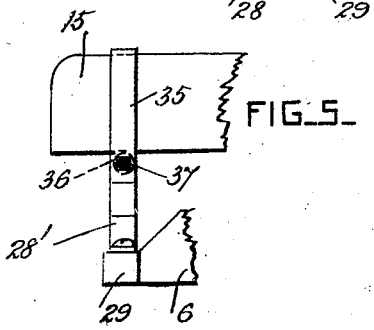
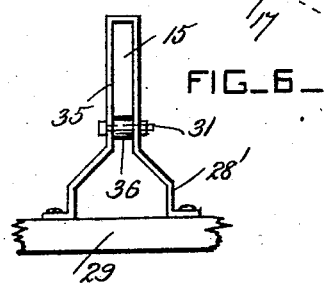
Inventor.
John Hughes
by Hubert W. Jenner.
Attorney.

Patented Apr. 27, 1926.

1,582,753

UNITED STATES PATENT OFFICE.

JOHN HUGHES, OF CLEAR LAKE, IOWA.

DIVIDER BOARD.

Application filed September 26, 1925. Serial No. 58,803.

*To all whom it may concern:*

Be it known that I, JOHN HUGHES, a citizen of the United States, residing at Clear Lake, in the county of Cerro Gordo and State of Iowa, have invented certain new and useful Improvements in Divider Boards, of which the following is a specification.

This invention relates to divider boards for foldable feeders used in connection with threshing machines to feed the cut grain into the threshing cylinders; and it consists in the novel construction and combination of the parts hereinafter fully described and claimed which permit the divider board to be folded with the feeder.

In the drawings, Figure 1 is a side view of a divider board constructed according to this invention, and showing also portions of the feeder in section. Fig. 2 is a plan view of the divider board. Fig. 3 is an end view of the front end of the divider board. Fig. 4 is a cross-section through the hinge, taken on the line 4—4 in Fig. 1, and is drawn to a larger scale. Fig. 5 is a side view, and Fig. 6 is an end view, of a modification.

Feeders for threshing machines when long have a joint in the middle so that they can be folded when not in use, and they are also hinged at their rear ends to the casing of the threshing machine. When the feeder is long it is desirable to have a divider board arranged longitudinally over it, so that all bundles of grain must be put longitudinally on it to be fed heads foremost into the threshing cylinder. When the bundles are not arranged longitudinally on the feeder, but lie crosswise of it, they are not usually fed into the cylinder in a satisfactory manner. When a foldable feeder is folded the divider board has to be detached from it, unless it also is constructed so as to be foldable.

The feeder has a frame 6 provided at its middle part with a joint 7 so that its front portion can be folded pivotally under its rear portion, and its rear portion is pivoted to the frame 8 of the threshing machine by a joint 9.

The feeder has an endless conveyer apron or net 10 which works over rollers or sprocket wheels 12, and this conveyer is driven by any approved means.

The divider board is formed of a rear section 14 and a front section 15 arranged end to end, and connected pivotally by a hinge 16. The hinge 16 is arranged over the joint 7 of the foldable feeder. The hinge 16 has a trough-shaped frame 17 in which the adjacent end portions of the board sections are seated. Each section is connected to the frame 17 by a pivot bolt 18, and a sleeve 19 is secured around each bolt in the hole in the board section to prevent the board from being clamped between the sides of the frame. A stop bolt 20, also provided with a similar sleeve 21, is secured to the upper part of the frame, and the ends of the sections have notches which engage with the sleeve 21. This construction of hinged joint locks the sections 14 and 15 together in one direction without the use of any removable pin, and holds them so that they can be folded with the feeder without detaching any pin or fastening device. The rear end of the rear board section 14 is rigidly secured to a crossbar 24 on the rear part of the feeder frame, by means of two curved stays 25 and a bracket 26. The stays 25 are riveted to the bracket 26 so that they do not move pivotally, and they always hold the section 14 at a predetermined distance from the feeder and clear of the conveyer, whether folded or not, as the crossbar 24 is secured to the feeder frame 6, and moves pivotally with it about the joint 9 as a center.

A bracket 28 is secured to a crossbar 29 at the front end of the front part of the feeder frame, and 30 are links which are pivoted to the bracket 28 by a pin 31 at one end. The upper parts of the links are offset, and have parallel upper end portions 32 which are pivoted to the front board section by a pin 33. These portions 32 form guides which prevent the front end of the front board section from twisting. The bottom edges of the divider board sections are supported clear of the conveyer 10.

When the feeder is raised or lowered to place it at different angles, the links 30 are moved on their pivots accordingly, and the front board section slides longitudinally.

When the front part of the feeder is folded under its rear part the front board section is also folded, as the hinge permits it to move in that direction, but prevents it from being folded in the reverse direction.

Instead of using the links 30, a bracket 28' may be bolted to the crossbar 29 in place of the bracket 28, as shown in Figs. 5 and 6. The bracket 28' has a loop-shaped guide channel 35 in its upper part in which the front end portion of the front board section 15 is slidable upon a roller 36 mounted on a pin 37 in the lower part of the guide.

What I claim is:

1. The combination, with a foldable feeder provided with a frame having a joint between its ends, of a divider board comprising two sections arranged end to end and connected by a hinge arranged over the said joint, means for securing the rear board section rigidly to the rear part of the feeder frame, thereby holding said section at a constant distance from the feeder, and means for supporting the front board section slidably from the front part of the feeder frame.

2. A foldable feeder and a foldable divider board as set forth in claim 1, the connecting hinge of the board sections being formed of a trough-shaped frame in which the end portions of the board sections are normally seated in abutment with each other, and free to fold in one direction only, and pivot bolts provided with sleeves which extend between the sides of the hinge frame.

3. A foldable feeder and a foldable divider board as set forth in claim 1, the front board section being supported from the front part of the feeder frame by means of a bracket secured to the feeder frame, and links pivoted at their lower ends to the said bracket and having offset parallel upper end portions which are pivoted against the sides of the front board section.

In testimony whereof I have affixed my signature.

JOHN HUGHES.